Dec. 10, 1957 G. ELLIOTT 2,816,238

ELECTRONIC SWITCHES

Filed Aug. 18, 1955

INVENTOR

BY GEORGE ELLIOTT

F. H. Henson

AGENT

United States Patent Office 2,816,238

Patented Dec. 10, 1957

2,816,238

ELECTRONIC SWITCHES

George Elliott, Rochester, N. Y., assignor to General Dynamics Corporation, a corporation of Delaware Application August 18, 1955, Serial No. 529,230

4 Claims. (Cl. 307—88.5)

This invention relates in general to electrical circuits, and more particularly to electronic switches for use in controlling electrical circuits.

With the advent of electronically controlled telephone and other communication systems, a need has arisen for an inexpensive electronic switch capable of switching communication and control signals without undue attenuation or distortion. For example, in the electronic telephone system disclosed in the copending application of Robert Trousdale, Serial No. 492,064, filed March 4, 1955, and assigned to the same assignee as the present invention, electronic switches are utilized to close the communication circuit between a calling line and a selected called line, to connect a ringing source to the called line, and for many other purposes.

Accordingly, it is the general object of this invention to provide new and improved switches for opening and closing electrical circuits.

It is a more particular object of this invention to provide new and improved electronic switches for opening and closing electrical circuits.

The present invention accomplishes the above cited objects by providing an electronic switch which comprises a semi-conductive device, which may be a transistor or the like, having first and second junctions serially connected with the circuit to be closed. The switch is turned "off" and "on" by the application of suitable potentials to a control electrode of the semi-conductive device.

In one embodiment of the invention, the switch circuit carries a rather large D.-C current when in the "on" condition, on which signals passed by the switch are superimposed. In another embodiment of the invention, when the switch is in the "on" condition, both junctions are biased in the forward direction as emitter junctions in the absence of signals. The instantaneous value of the signal determines which of the junctions functions as an emitter junction and which of the junctions functions as a collector junction. Since the semi-conductive device in the latter embodiment functions in a bilateral manner to pass either positive or negative signals in either direction, it is desirable that it exhibit good amplification with either junction acting as the emitter and the opposite junction acting as the collector. Most transistors have this characteristic to a sufficient extent, although better results can be achieved with transistors specially designed to have good forward and reverse characteristics.

Further objects and advantages of the invention will become apparent as the following description proceeds, and features of novelty which characterize the invention will be pointed out in particularity in the claims annexed to and forming a part of this specification.

For a better understanding of the invention, reference may be had to the drawing which comprises five figures on one sheet.

Figure 1:
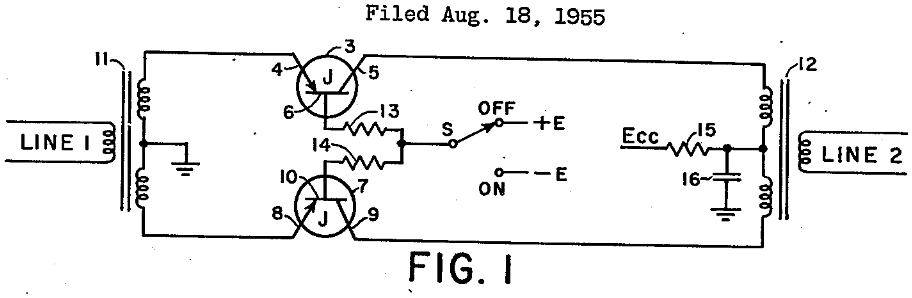
Fig. 1 shows a balanced electronic switch using conventional transistors.

Referring to the drawing, it will be noted that PNP junction transistors have been used in all of the various figures to illustrate the invention. As is well known in the art, NPN junction transistors could be used in the exact same circuits by merely reversing the polarity of the biasing potentials. The transistors used in Fig. 1 have been given the conventional notation of an arrow identifying the emitter electrode while the transistors shown in Figs. 2–5, inclusive, have an arrow superimposed on both the so-called emitter and collector electrodes. This notation signifies that these transistors are bilateral in operation and have good amplification with either junction used as the emitter. Also, it will be noted that transformer coupling has been used to illustrate the invention. It is to be understood that the invention could be practiced with resistive or capacitive coupling of any well known type. And finally, no termination has been shown on the lines since the lines may be terminated by telephone sets for two-way communication, or one line may be connected to a signal generator of any type while the other line may terminate in a load impedance.

Referring to Fig. 1 of the drawing, it can be seen that in this embodiment of the invention the switch comprises a pair of PNP junction transistors interposed in a connection between line 1 and line 2. Emitter electrode 4 and collector electrode 5 of transistor 3 are connected in series with the upper wire of the circuit while emitter electrode 8 and collector electrode 9 of transistor 7 are connected in series with the lower wire of the circuit. The conductivity of the transistors is controlled over a multiple connection to the base electrodes 6 and 10 through base resistors 13 and 14, respectively.

A simple mechanical switch S has been shown for the purpose of controlling the off-on condition of the transistor switch. It is to be understood that any well known means may be used to control the application of the control potentials to the base electrodes.

With switch S in the "off" condition, transistors 3 and 7 are rendered non-conductive since a PNP transistor is non-conductive whenever the base is positive with respect to the emitter. Switch S serves to connect positive potential source +E to the base electrodes 6 and 10, while the emitter electrodes 4 and 8 are at ground potential by virtue of the center tap connection to the secondary winding of transformer 11. Collector supply voltage is applied to the collector electrodes 5 and 9 from potential supply source $E_{cc}$ through current limiting resistor 15 to the center tap connection of the secondary winding of transformer 12. In this embodiment of the invention, the absolute value of negative potential source $E_{cc}$ is greater than the peak signal voltage of the signals applied in either line 1 or line 2.

With the transistors in the non-conducting condition, a large insertion loss is presented to signals in either direction since a T-type attenuator is formed between the back resistance of the emitter junction, the base circuit resistor, the back resistance of the collector junction, and the load impedance (not shown). Potential source +E should be of higher potential than the peak signal voltage blocked by the switch since the transistors would conduct if their emitters became positive with respect to their bases.

When switch S is operated to its "on" position, negative potential source −E is connected to base electrodes 6 and 10 and transistors 3 and 7 are rendered conductive to close the circuit between lines 1 and 2. It might be mentioned at this time that negative potential source —E is of high enough potential to provide sufficient base current to insure that the transistors are rendered fully conductive, or saturated, throughout the entire voltage swing of the signal. In the absence of signal voltage, D.-C. current flows from ground through the emitter base and collector of each of the transistors to negative potential source $E_{cc}$. Signals appearing on either line 1 or line 2 are induced in the secondary windings of transformers 11 and 12, respectively, and superimposed on the D.-C. current. Thus the signals pass through the conductive transistors on a push-pull basis with virtually no attenuation. Since $E_{cc}$ has an absolute value greater than the maximum peak signal voltage, collector electrodes 5 and 9 are negative with respect to emitter electrodes 4 and 8, respectively, at all times. Thus the switch is not bilateral in operation. Capacitor 16 is utilized to decouple A.-C. signals from potential source $E_{cc}$.

Since transistors exhibit appreciable current gain with the base taken as the input electrode, the base resistors 13 and 14 may be made very large in comparison to the impedance level of the switch. For example, in one tested model of the switch, resistors 13 and 14 had a value of 16,000 ohms each when potential sources +E and —E had a voltage value of +5 volts and —5 volts, respectively. Thus, when the transistors are conducting, the shunting effect of the base resistors is small and the insertion loss of the switch is low as a result.

Figure 2:
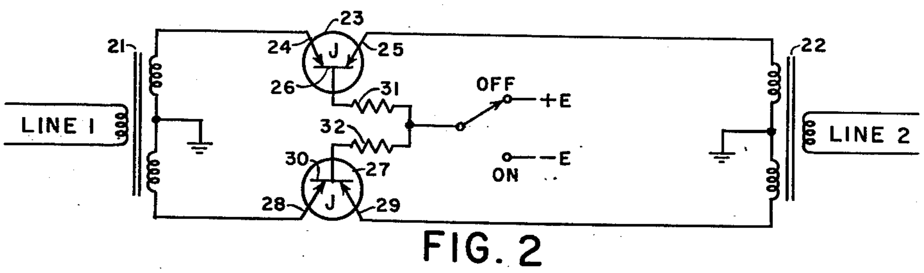
Fig. 2 shows a balanced electronic switch using bilateral transistors.

Referring to Fig. 2 of the drawing, it can be seen that this figure differs from Fig. 1 in that the transistors used in the circuit are identified as bilateral and potential source $E_{cc}$ has been reduced to zero or replaced with ground potential. Transistor 23 has first and second emitter-collector junctions which are the junctions between electrodes 24 and 26, and 25 and 26, respectively, connected in series with the upper wire of the circuit to be closed while transistor 27 has first and second emitter-collector junctions, which are the junctions between electrodes 28 and 30, and 29 and 30, respectively, connected in series with the lower wire of the circuit to be closed.

With switch S in the "off" condition, both transistors are rendered non-conductive as before since the control or base electrodes 26 and 30 are positive with respect to the emitter-collector junction.

When switch S is operated to its "on" position, the transistors are enabled for conduction with both their first and second junctions biased in the forward direction as if they were emitter junctions. Base current flows from ground on the center tap connections of the secondary windings of transformers 21 and 22 and through both junctions of each of the transistors, and through base resistors 31 and 32 to negative potential source —E. Thus a saturating base current flows in both transistors.

During the half-cycle of an input signal from line 1 which causes electrode 24 of transistor 23 to become positive, the junction between electrodes 24 and 26 acts as an emitter and the signal adds to the base current so that the junction between electrodes 25 and 26 conducts the signal current. Electrode 25 then follows the potential of electrodes 24 and 26. During the half-cycle of an input signal from line 1 which causes electrode 24 of transistor 23 to become negative, the junction between electrodes 25 and 26 acts as the emitter. The signal acts to subtract from the controlling base current somewhat, and the junction between electrodes 24 and 26 conducts signal current as if it were a saturated collector junction. The negative signal on electrode 24, therefore, appears at electrode 25. The operation of transistor 27 is, of course, the reverse of the operation of transistor 23. That is, when electrode 24 of transistor 23 is positive and the junction between electrodes 24 and 26 is thus acting as an emitter, electrode 28 of transistor 27 is negative and the junction between electrodes 29 and 30 is acting as an emitter.

Here again, negative potential source —E is of high enough potential to provide sufficient base current to insure that the transistors are rendered fully conductive, or saturated, throughout the entire voltage swing of the signal. It has been found that $$E=e_{max}\left[1+\left(1+\frac{Rb}{R}\right)\left(\frac{1-\alpha}{\alpha}\right)\right]$$

where E is the voltage value of the potential source —E, $e_{max}$ is the peak signal voltage, $Rb$ is the base resistance, R is the load resistance, and $\alpha$ is either the forward or reverse, whichever is the lesser, current amplification factor of the transistor.

Figure 3:
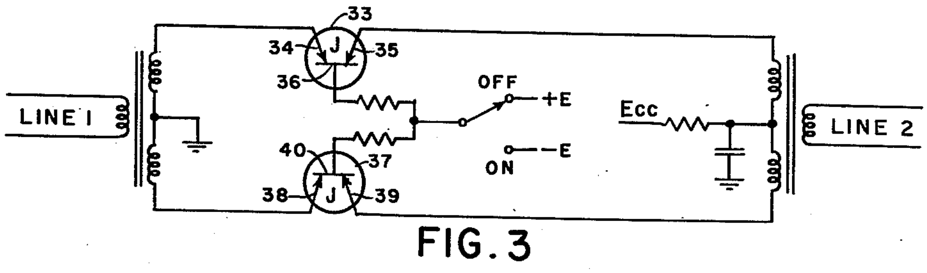
Fig. 3 shows a balanced electronic switch using bilateral transistors with slightly different biasing than the circuit of Fig. 2.

Fig. 3 is identical to Fig. 1 except that bilateral transistors are shown. The circuit illustrates the case when $E_{cc}$ has a predetermind negative absolute value between ground and the peak signal voltage. When switch S is closed to the "on" position, the junctions between electrodes 34 and 36, and 38 and 40 of transistors 33 and 37, respectively, are biased as emitter junctions and the junctions between electrodes 35 and 36, and 39 and 40 of transistors 33 and 37, respectively, are biased as collector junctions. D.-C. current thus flows through the conducting transistors from ground to negative potential source $E_{cc}$. During the positive half-cycles and during a portion of the negative half-cycles of the signals applied to electrode 34, the junction between electrodes 34 and 36 acts as an emitter. However, during the portion of the negative half-cycles in which electrode 35 becomes more positive than electrode 34, the junction between electrodes 35 and 36 acts as an emitter while the junction between electrodes 34 and 36 acts as a collector.

Figure 4:
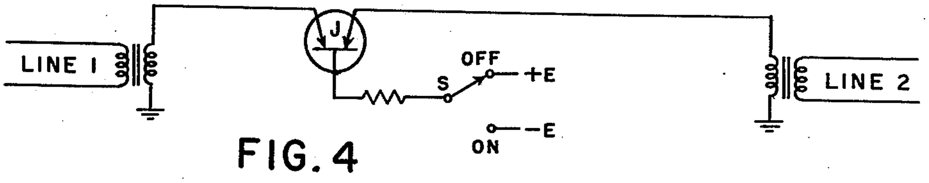
Fig. 4 shows a single-sided electronic switch using a bilateral transistor.

Fig. 4 shows another embodiment of the invention in which a single transistor is used to open and close an electrical circuit. The circuit functions in a manner identical to the operation described in conjunction with Fig. 2. Tests of this circuit have shown that for typical transistors, a very low series impedance is presented to the circuit when the transistor is conducting and a rejection ratio greater than 90 db can be achieved when the switch is non-conductive.

Figure 5:
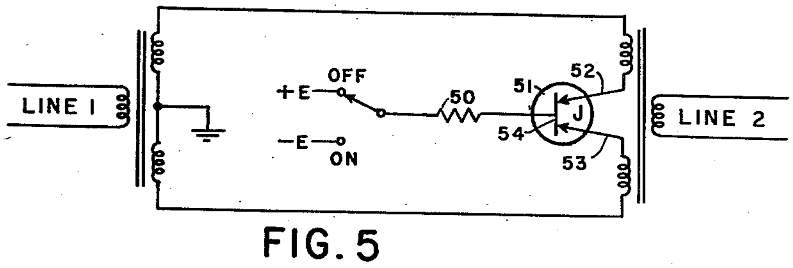
Fig. 5 shows a balanced electronic switch comprising a single bilateral transistor.

Fig. 5 shows still another embodiment of the invention in which the balanced electronic switch comprises a single bilateral transistor. In addition to having the obvious advantage of full balance of the circuit, this embodiment has several other advantages over the embodiment of Fig. 4. This circuit has no A.-C. signal loss in base resistor 50, thus it will have less loss than the single-sided switch. Furthermore, there is no modulation of base current by signal current since the signal is applied to electrodes 52 and 53 simultaneously. Also, the switch can handle approximately twice the A.-C. voltage across line 1 or line 2 that can be handled by the switch of Fig. 4 at the same maximum current. Thus, the switch of Fig. 5 can handle approximately twice the power. One disadvantage is the lack of an equivalent T-pad when "off," whereby this circuit has a poorer ratio between "on" and "off" signal transmission.

While there has been shown what is considered at present to be the preferred embodiments of the invention, other modifications will readily occur to those skilled in the art. It is not, therefore, desired that the invention be limited to the specific arrangements shown and described, and it is intended to cover in the appended claims all such modifications as fall within the true spirit and scope of the invention.

What is claimed is:

1. In combination, an input circuit, an output circuit, an electronic switch comprising a semi-conductive device having first and second emitter-collector electrodes, and a control electrode, a transformer having first, second, and third windings, means for connecting one end of said first winding to said first electrode, means for connecting one end of said second winding to said second electrode, means for coupling said input circuit to the other ends of said first and second windings, means for coupling said output circuit to said third winding, and means for controlling the impedance of said switch comprising means for selectively biasing said control electrode either positive or negative with respect to both said first and second electrodes.

2. In combination, a first line on which electrical signals may appear, a second line on which electrical signals may appear, an electronic switch comprising a semi-conductive device having first and second emitter-collector electrodes, and a control electrode, a transformer having first, second, and third windings, means for connecting one end of said first winding to said first electrode, means for connecting one end of said second winding to said second electrode, means for coupling said first line to the other ends of said first and second windings, means for coupling said second line to said third winding, and means for controlling the impedance of said switch comprising means for selectively biasing said control electrode either positive or negative with respect to both said first and second electrodes.

3. In combination, an input circuit, an output circuit, an electronic switch comprising a semi-conductive device having first and second emitter-collector electrodes, and a control electrode, first and second transformers, each of said transformers having first, second, and third windings, means for coupling said input circuit to said first winding on said first transformer, means for coupling said output circuit to said first winding on said second transformer, means for connecting a first terminal of the second winding of said first transformer to a first terminal of the second winding of said second transformer, means for connecting a first terminal of the third winding of said first transformer to a first terminal of the third winding of said second transformer, means for connecting the other terminals of the second and third windings of said first transformer together, means for connecting the other terminal of said second winding of said second transformer to said first electrode, means for connecting the other terminal of said third winding of said second transformer to said second electrode, and means for controlling the impedance of said switch comprising means for selectively biasing said control electrode either positive or negative with respect to both said first and second electrodes.

4. In combination, a first line on which electrical signals may appear, a second line on which electrical signals may appear, an electronic switch comprising a semi-conductive device having first and second emitter-collector electrodes, and a control electrode, first and second transformers, each of said transformers having a primary winding and first and second secondary windings, means for coupling said first line to the primary winding of said first transformer, means for coupling said second line to the primary winding of said second transformer, means for connecting one end of said first secondary winding of said first transformer to one end of said first secondary winding of said second transformer, means for connecting one end of said second secondary winding of said first transformer to one end of said second secondary winding of said second transformer, means for connecting the other end of said first winding of said first transformer to the other end of said second winding of said first transformer, means for connecting the other end of said first winding of said second transformer to said first electrode, means for connecting the other end of said second winding of said second transformer to said second electrode, and means for controlling the impedance of said switch comprising means for selectively biasing said control electrode either positive or negative with respect to both said first and second electrodes.

References Cited in the file of this patent

UNITED STATES PATENTS

| | | |
|---|---|---|
| 2,691,073 | Lowman | Oct. 5, 1954 |
| 2,722,649 | Immel et al. | Nov. 1, 1955 |
| 2,763,832 | Shockley | Sept. 18, 1956 |